4 Sheets—Sheet 1.
A. & M. RUNSTETLER.
Combined Drill and Corn Planter.
No. 210,214. Patented Nov. 26, 1878.
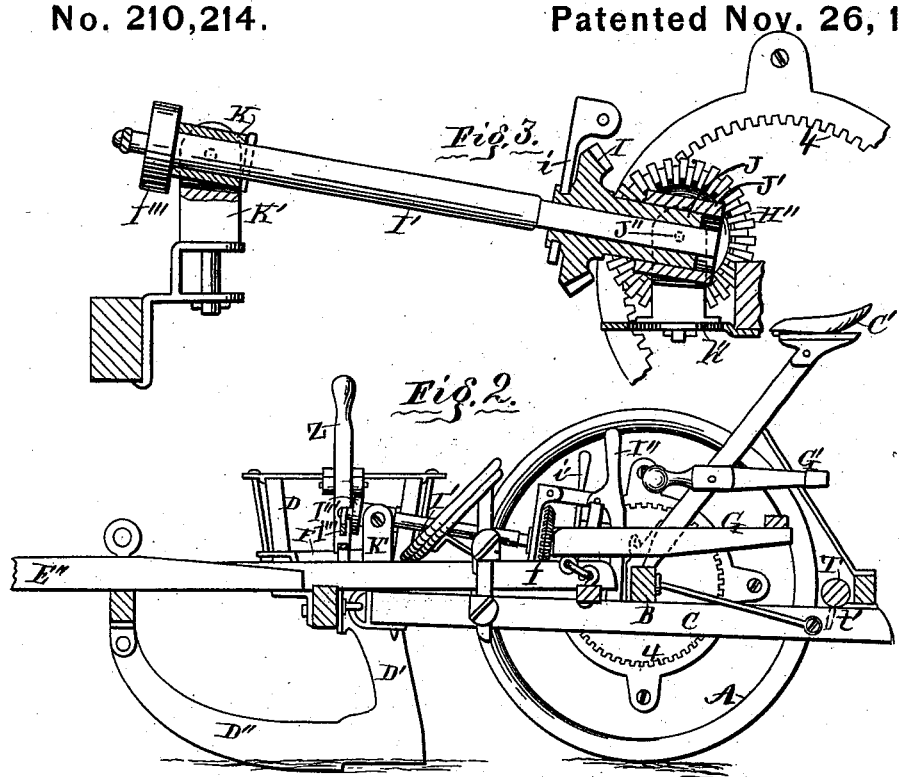
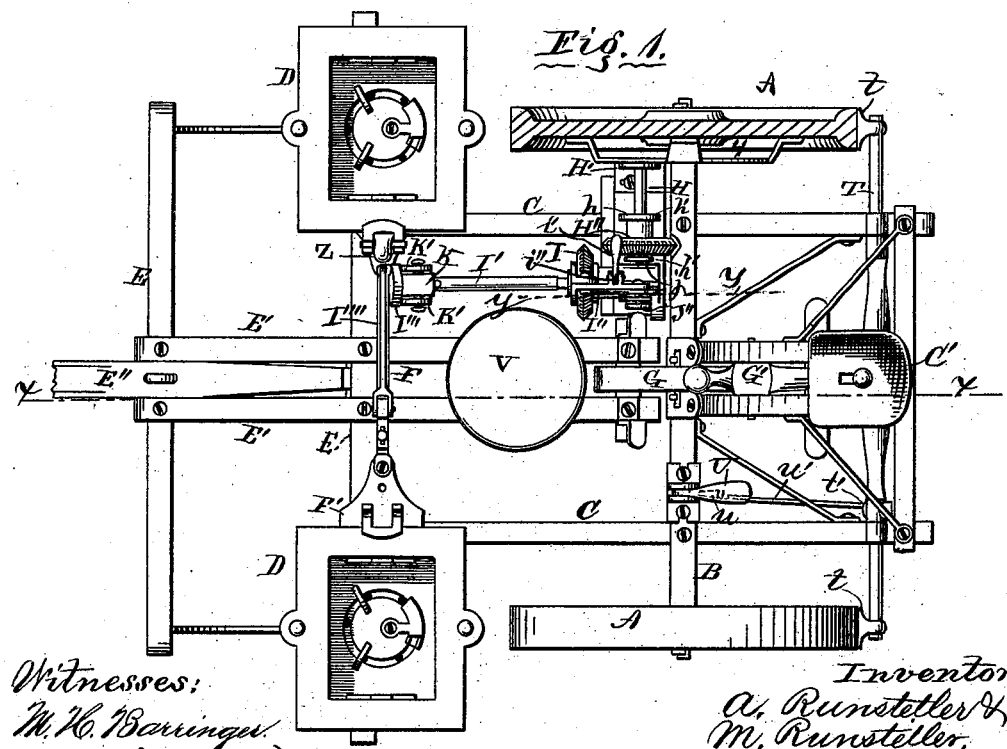
Witnesses:
M. H. Barringer.
A. McCallum
Inventors:
A. Runstetler &
M. Runstetler,
By W. B. Richards,
Atty.
N. PETERS, PHOTO-LITHOGRAPHER, WASHINGTON, D. C.

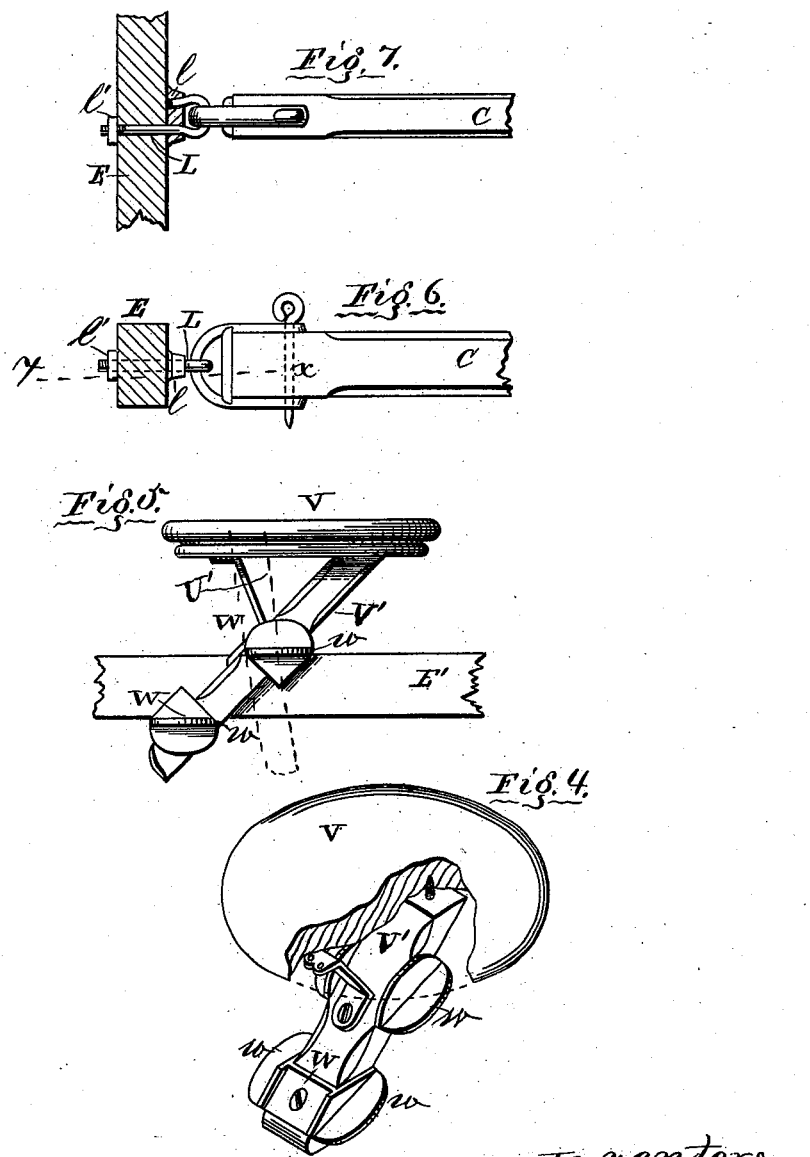

4 Sheets—Sheet 3.
A. & M. RUNSTETLER.
Combined Drill and Corn Planter.
No. 210,214. Patented Nov. 26, 1878.
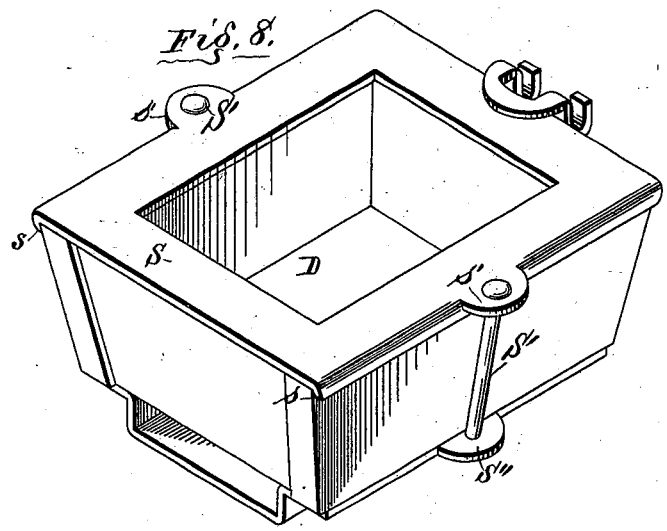
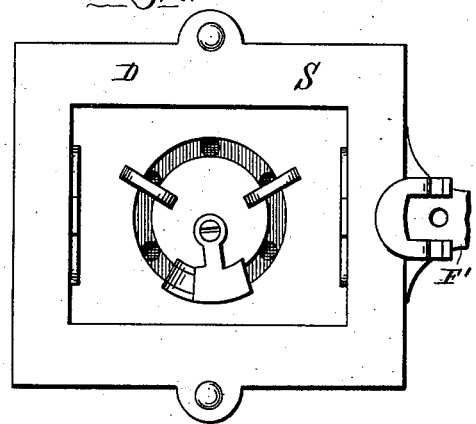
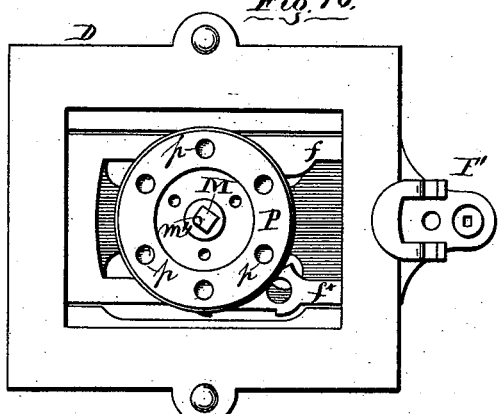
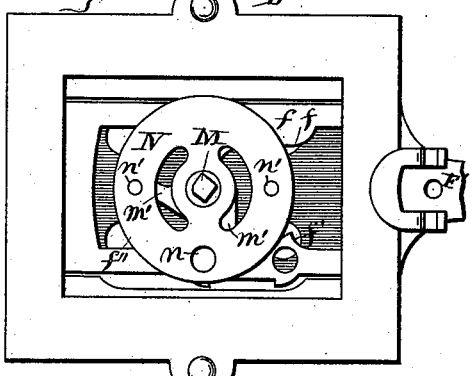
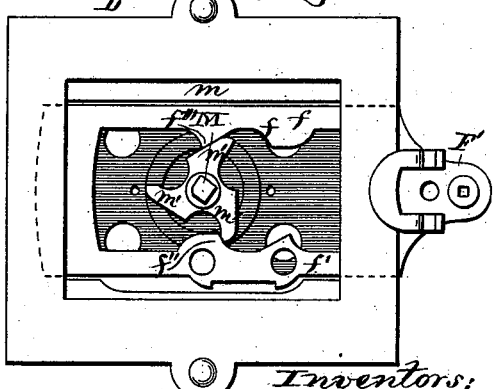
Witnesses:
M. K. Barringer
A. McCallum
Inventors:
Andrew Runstetler and
Michael Runstetler,
By W. B. Richards
Atty.

4 Sheets—Sheet 4.
A. & M. RUNSTETLER.
Combined Drill and Corn Planter.
No. 210,214. Patented Nov. 26, 1878.
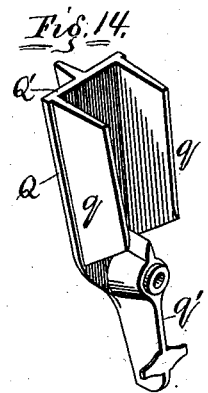
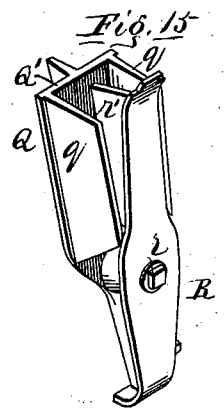
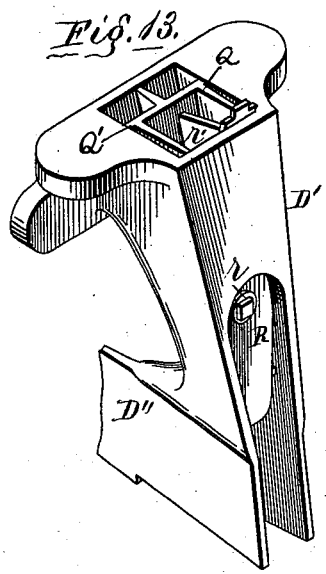
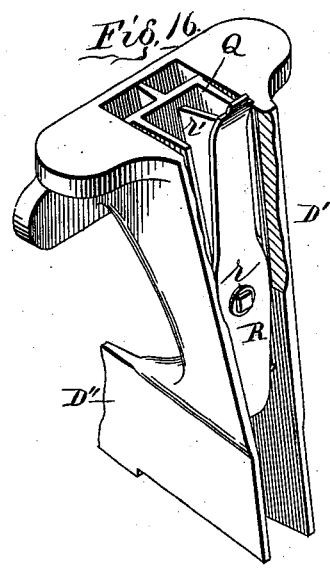

UNITED STATES PATENT OFFICE.

ANDREW RUNSTETLER AND MICHAEL RUNSTETLER, OF MOLINE, ILLINOIS, ASSIGNORS TO DEERE & MANSUR COMPANY, OF SAME PLACE.

IMPROVEMENT IN COMBINED DRILL AND CORN-PLANTER.

Specification forming part of Letters Patent No. 210,214, dated November 26, 1878; application filed January 2, 1878.

*To all whom it may concern:*

Be it known that we, ANDREW RUNSTETLER and MICHAEL RUNSTETLER, of Moline, in the county of Rock Island and State of Illinois, have invented certain new and useful Improvements in Combined Drill and Corn-Planter; and we do hereby declare that the following is a full, clear, and exact description thereof, which will enable others skilled in the art to which it appertains to make and use the same, reference being had to the accompanying drawings, and to letters of reference marked thereon, which form a part of this specification, in which—

Figure 1 is a top-plan view of a corn-planter embodying our invention. Fig. 2 is a sectional view in the line $x\ x$ in Fig. 1. Fig. 3 is an enlarged vertical sectional view through the parts crossed by the line $y\ y$ in Fig. 1. Fig. 4 is a perspective view of the bar supporting the dropman's seat. Fig. 5 is a side elevation of Fig. 4 and parts adjacent. Fig. 6 is an enlarged side elevation of the coupling between the front and rear frames. Fig. 7 is a horizontal sectional view in the line $x\ x$ in Fig. 6. Fig. 8 is a perspective view of one of the seed-boxes. Figs. 9, 10, 11, and 12 are top-plan views of the interior of the seed-box, respectively showing the cap in place, the cap removed, the seed-plate removed, and the fixed plate below the seed-plate removed. Fig. 13 is a perspective view of the seed-tube. Fig. 14 is a perspective view of the conductor removed from the seed-tube. Fig. 15 is a perspective view of the conductor and discharge-valve removed from the seed-tube. Fig. 16 is a perspective view of the seed-tube with its rear portion removed.

Our invention relates to combined drill and corn-planter.

The improvements relate, first, to the devices for transmitting motion from the supporting-wheel to the seed-droppers, which improvements consist in swiveled bearings for the main connecting-rod, by which the machine is adapted to conform to uneven ground without affecting the operation of the drilling mechanism; and further consists in improvements in the devices for throwing the parts in and out of gear.

The invention relates, secondly, to the seed-box, consisting in a cap bolted to the bottom plate, for securing the seed-box in place.

The invention relates, thirdly, to the seed-measuring devices in the hopper, and consists in a central shaft with three arms, which receive motion from the slotted slide-bar, and impart an intermittent rotary motion to the seed-cup disk, which is seated on the upper end of said central shaft.

The invention relates, fourthly, to the construction of the conductor and discharge-valve in the seed-tube; and consists, first, in uniting the two by the same bolt which serves as an axis on which the valve is oscillated; second, in a conductor and discharge-valve so formed that when united they may be inserted and securely held in place in the seed-tube without bolts or other fastenings, adapting them to be readily and easily removed when desired.

Referring to the drawings by letters, each letter indicating the same part or parts in the different views, A A represent the wheels, B the axle, C C the side-frame bars, and C' the driver's seat of the rear frame of an ordinary corn-planter. The forward ends of the bars C are hinged to an ordinary forward frame, consisting of seed-boxes D D, seed-tubes D' D', runners D'' D'', cross-bars E E, parallel bars E', projecting in rear of the bars E, and a tongue or draft-pole, E''.

F is the ordinary connecting-bar between the slides F' in each seed-box D. G is an ordinary foot-lever, for raising and lowering the forward frame by acting on the rear end of the bars E', and may be locked in position to hold the forward frame in an elevated position by turning down the rear end of the pivoted bar G'.

H is a shaft parallel with the axle B, and journaled in bearings $h'$ in standards H', which project upward from a plate, $h''$, on one of the frame-bars C. The shaft H has a pinion, H', on one end, which gears with a driving-gear, 4, on the wheel A, and a pinion, H'', on its other end, which gears with a sliding or clutch pinion, I, which is seated on a square arbor on one end of a shaft, I'. The clutch-pinion I is thrown into and out of gear with the pinion H'' by means of a lever, I'', having a forked arm, $i$, for engaging the hub of the pinion I, and provided with a spring-catch, $i'$, for holding it in and out of gear by engaging with a projection, $i''$.

The rear square arbor of the shaft I' is seated in a cylindrical block, J, which is seated so that it can rotate in a cylindrical bearing, J', which is hung by trunnions or set-screws J'' in standards $j$, so that the bearings J can be oscillated, and permit the forward end of the shaft I' to be raised and lowered. The forward end of the shaft I' has bearings in a cylindrical block, K, which is suspended in standards K' on the forward frame of the planter by pointed set-screws, so that it may be oscillated in a vertical plane, to allow the rear end of the shaft I' to be raised and lowered. The oscillating bearings at each end of the shaft I' will adapt it to the changes in the relative positions of the forward and rear frames in passing over uneven ground, and the shaft I', sliding loosely in the pinion I and bearing J, will adapt it to the change required by the rising and falling of the forward and rear frames from the same causes.

The forward end of the shaft I' has a crank-wheel, I''', connected with the connecting-bar F by a rod, I'''', so that when the pinion I is in gear with the pinion H'' the seeding devices will be operated from the wheel A, and the machine adapted for use as a drill, and the pinion I may be thrown out of gear to move the machine without operating the seeding devices.

Fig. 6 is a side elevation, showing the coupling between the forward and rear frames. The forward part of said coupling is a hook-bolt, L, the shank of which passes through a plate, $l$, and then through the bar E, where it is secured by a nut, $l'$, and constitutes a simple, cheap, and effectual and easily removed and replaced coupling.

M is a short vertical shaft, its lower end journaled in the bottom plate, $m$, of the seed-box, and has three projecting arms, $m'$, constructed with faces, as shown at Fig. 12 of the drawings. Each slide F' is slotted, so as to have two limbs, $f f'$, constructed and provided with projecting cams $f'' f'''$. At Fig. 12 the full lines show the slide F' at the extreme right-hand end of its throw, the cam $f''$ having given an impulse to the shaft M by acting on one of the arms $m'$, and the cam $f'''$ on the opposite limb of the slide acting as a stop on another arm, $m'$. The dotted lines show the slide at the other end of its throw. Immediately over the slide F' and arms $m'$ is a fixed circular plate, N, with an opening, $n$, for the passage of the seed, and an opening for the shaft M. This plate N is bolted to the bottom plate, $m$, by bolts $n'$. (See Fig. 11.) The upper end of the shaft M has two projecting pins, $m''$, which connect the disk P therewith, which disk has seed-cup openings $p$, as desired, and which discharges seed through the openings beneath it in the ordinary and well-known manner, when an intermittent rotary motion is imparted to said seed-cup disk D from the reciprocating motion of the slides F'.

Fig. 10 is a top view of the disk P. Fig. 9 is a top view of an ordinary cap and cut-off over the disk P.

The seed-tubes D' are constructed, as plainly shown at Fig. 13, with their rear portions open at the lower end and closed at the upper end. The seed-conductor Q is formed of a plate, Q', having short projecting side flanges, $q$, at its upper end, and its lower end formed into a rib, $q'$, which extends downward from the lower ends of the flanges $q$. The discharge-valve R is a plate, journaled to the enlarged upper end of the rib $q'$ by a bolt, $r$, and its lower end curved downward over the lower rounded end of the rib $q'$. The upper end of the valve R has a rib, $r'$, projecting inward, and which serves to direct the charges of seed alternately to opposite sides of the conductor Q as the valve R is oscillated on the bolt $r$ in the ordinary manner. The lower inwardly-curved end of the valve R retains the seed-discharges alternately on opposite sides of the rib $q'$ in the evident manner. The valve R and conductor Q, when connected by the bolt $r$, may be seated in the tube D' by simply inserting them by the upper end of the seed-tube, and may be removed in a converse manner.

S is a metal plate, adapted to fit the top of the seed-box D, and with a flanged outer edge, $s$, projecting downward over the edge of the box, and has projecting lugs $s'$, through which bolts S' pass, which also pass through the lugs $s''$ from the bottom plate of the hopper. By means of taps on the bolts S' the hopper and bottom are firmly secured to each other.

T is a bar, journaled on the rear planter-frame, and has wheel-scrapers $t$ on its ends, and a pendent arm, $t'$, which is connected with a pendent arm, $u$, from a foot-pedal, U, the forward end of which is hinged to the axle B by a rod, $u'$. The extended pedal U acts by gravity to hold the scraper against the wheels. They may be released by raising the free end of the pedal.

V is the dropman's seat, provided with metal plates W on its standard V', which metal plates have projecting flanges $w$, and are located on the standard V', as shown at Fig. 4. When the seat-bar V' is in the position shown at Fig. 5, the seat will be held sufficiently by the projecting lugs $u$ resting on the bars C, and may be easily moved back and forth by turning the seat-bar into position shown by dotted lines at Fig. 5. The seat may be removed by turning it around to bring the projecting lugs in line with the bars C.

By disconnecting the connecting-rod I'''' from the bar F, the seeding devices may be operated by hand by the hand-lever Z, in the usual manner.

Having thus described our invention, what we claim as new, and desire to secure by Letters Patent, is—

1. In a seed-drill operated by gear-connections from one of the supporting-wheels, the rotating shaft I', hung in oscillating bearings J and K at its ends, to permit it to oscillate laterally while passing over uneven surfaces, substantially as described, and for the purpose specified.

2. The shaft H, having pinions H' H'', combined with the driving-gear 4, pinion I, laterally and longitudinally oscillating shaft I', and lever I'', substantially as described, and for the purpose specified.

3. The shaft M, having cams $m'$, or equivalent devices, for receiving motion from actuating mechanism, arranged to operate with the seed-cup plate P, and a fixed plate, N, seated between the series of cams $m'$ and the seed-cup plate P, substantially as and for the purpose specified.

4. The plate S, combined with the seed-box D and its bottom plate, and with the bolts S', substantially as described, and for the purpose specified.

5. In a corn-planter, the removable conductor Q, which is inserted within the seed-tube, and discharge-valve R, journaled to each other, substantially as described, and for the purpose specified.

6. The conductor Q and discharge-valve R, constructed as described and journaled to each other, to adapt them to seating and removal from the seed-tubes without the use of bolts or other fastenings, substantially as described, and for the purpose specified.

In testimony that we claim the foregoing as our own we affix our signatures in presence of two witnesses.

ANDREW RUNSTETLER.
MICHAEL RUNSTETLER.

Witnesses:
J. T. BROWNING,
J. W. ATKINSON.